Jan. 1, 1957

S. L. JACKSON 2,775,905

SAFETY GUARD

Filed Jan. 7, 1954

*INVENTOR.*
STACY L. JACKSON

BY Kenneth E. Prince

United States Patent Office 2,775,905
Patented Jan. 1, 1957

2,775,905

SAFETY GUARD

Stacy L. Jackson, Glen Burnie, Md., assignor to W. R. Grace & Co., New York, N. Y., a corporation of Connecticut Application January 7, 1954, Serial No. 402,709

6 Claims. (Cl. 74—609)

The present invention relates to a safety guard and in one specific aspect, to an improved guard for revolving parts.

Safeguarding of mechanical equipment or its exposed revolving parts is usually considered during its design. During the stage of design, features of safe operation are usually incorporated so that a minimum of specific guarding is required for the finished piece of equipment. However, when the equipment is installed, such auxiliaries as shafts, couplings, and other exposed revolving parts, may be inadequately guarded or unsuitable to the area to which they are applied.

One type of guard prominently employed for shaft couplings and the like is formed of a single piece of material which is curved over the couping and bolted to a supporting base. The use of this type of guard for shaft couplings has certain disadvantages. In order to reach the coupling for routine adjustments, inspections or lubrication it is necessary to remove the guard by unscrewing the bolts. This operation is time-consuming and affects the output because the equipment must be shut down while the bolts are being removed. Further delay is caused when the bolts become corroded as by contact with corrosive agents present in the atmosphere. The corroded bolts must then be sawed away before access is gained to the coupling.

It is therefore an object of this invention to provide an improved safety guard. It is a further object to provide a flexible guard that will permit easy access to guarded parts. Other objects and advantages will become apparent from the following description and accompanying drawing.

The present invention consists of two opposed upright members and a flexible covering member, the flexible covering member being disengageable from at least one of said upright members by a simple motion.

Figure 1:
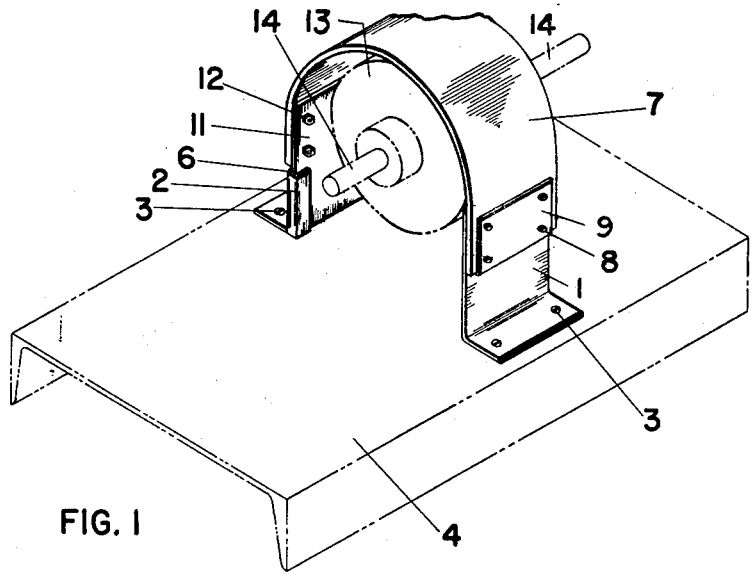
Figure 2:
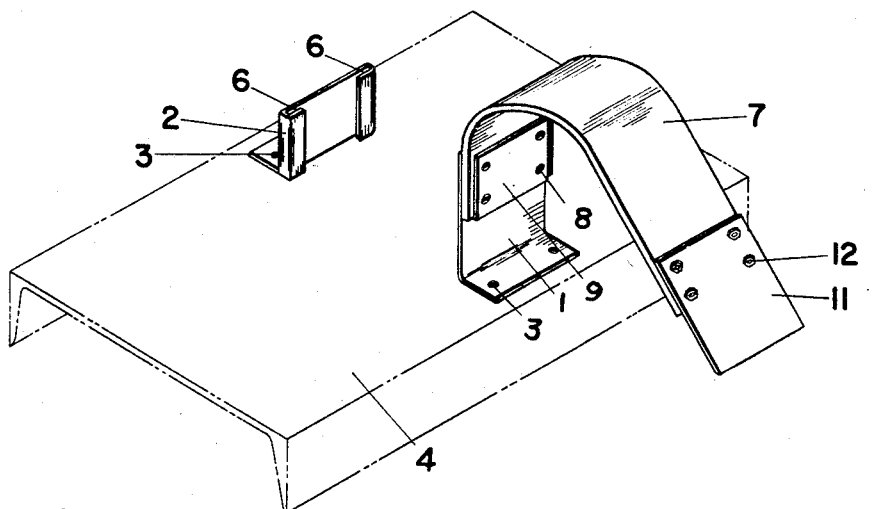

In the drawings, Fig. 1 is a perspective view of the safety guard in a closed position. Fig. 2 is a perspective view of the guard in an open position.

Referring now to Fig. 1, two opposed upright members 1 and 2 are angled at their base and secured by bolts 3 to a base 4, shown in outline. The sides of upright member 2 are bent inwardly to form a channel defined as 6. The upright members 1 and 2 are spaced apart a distance slightly greater than the revolving part to be guarded. The base 4 may be any support to which the upright members 1 and 2 are secured. Means other than bolts 3, such as welding or riveting, may be employed to secure the upright members.

An elongated flexible covering member 7 is secured by bolts or rivets 8 between upright member 1 and plate 9. The covering member 7 is of sufficient length to form an inverted U-shaped cover over the revolving part and extends from upright member 1 to upright member 2. The covering member 7 may be of any relatively stiff but flexible material such as hard rubber or fabric belting.

A tongue 11 composed of a metal plate or other stiff material is secured by bolts or rivets 12 to the unsecured end of the flexible covering member 7. The tongue 11 holds the covering member 7 in place in the channel 6 of upright member 2 and prevents movement of the covering member 7 towards the revolving part.

To form a closed guard, the unsecured end of the flexible covering member 7 is drawn over the coupling 13 and shaft 14 (both shown in outline), and the tongue 11 is then inserted into the channel 6 of upright member 2. When access is desired to the coupling or other revolving parts to which the guard is adapted, the flexible covering member 7 is simply withdrawn from the channel 6 of the upright member to open the guard.

In a further embodiment of the invention, upright members 1 and 2 may both have their opposed edges bent inwardly to form parallel channels. In this embodiment both ends of the covering member 7 are detachable, thus permitting easy access to either side of the guarded part.

As thus described, the present invention provides for an improved guard capable of safeguarding revolving parts and in which adjustments, inspection, or lubrication of the parts may be accomplished within a minimum of time and inconvenience.

I claim:

1. A safety guard comprising a pair of opposed upright members, the sides of at least one of said members being bent inwardly to form a channel, means for securing said upright members, and an elongated flexible covering member secured at one end to one of said upright members, the free end of said covering member being inserted into the channel of the second upright member to form an inverted U-shaped guard.

2. A safety guard comprising two opposed upright members, a channel formed at the parallel edges of at least one of said members by return-folding said edges inwardly, means for securing said upright members rigidly in place adjacent and on opposite sides of the member to be guarded, and an elongated flexible covering member adapted to connect with both upright members, the connection with at least one of said upright members being detachable.

3. A shaft coupling guard comprising two opposed upright members, at least one of said members having its opposed edges bent inwardly to form parallel channels, said upright members being spaced apart a distance slightly greater than the diameter of the coupling, means for securing the upright members adjacent said coupling, and an elongated flexible covering member secured at one end to one of said upright members and adapted to be received at its opposite end in said parallel channels.

4. A shaft coupling guard comprising two opposed upright members, at least one of said members having channels formed at its parallel edges, said upright members being angled at their base and spaced apart a distance slightly greater than the diameter of the coupling, means for securing the upright members, in place, and an elongated flexible covering member secured at one end to one of said upright members, the unsecured end of said covering member being inserted into the channels of the second upright member to form a unitary shield for said coupling.

5. A shaft coupling guard comprising two upright members having parallel channels formed at the opposed edges, said upright members being adapted at their bases for securing in a position spaced apart a distance slightly greater than the diameter of the coupling, means for securing the upright members, and an elongated flexible covering member adapted to flex over the coupling and be inserted into the channels of the upright members to form a unitary cover over said shaft coupling.

6. A shield for guarding revolving parts comprising a pair of opposed upright members mounted adjacent said revolving parts and extending parallel with said parts on opposite sides thereof, an elongated flexible cover attached at one end to one of said upright members, a rigid tongue secured to the unattached end of said cover, and a channel formed in the other of said upright members adapted to receive said tongue and hold it against movement towards said coupling.

References Cited in the file of this patent

UNITED STATES PATENTS

| | | |
|---|---|---|
| 917,926 | Coffin | Apr. 13, 1909 |
| 926,800 | Young | July 8, 1909 |
| 1,251,251 | Lindeburg | Dec. 25, 1917 |
| 1,386,026 | Pribil | Aug. 2, 1921 |